United States Patent [19]

Sano et al.

[11] Patent Number: 4,865,865
[45] Date of Patent: Sep. 12, 1989

[54] METHOD FOR PREPARING SOLID FOODSTUFFS

[75] Inventors: Hiroyuki Sano, Kishiwada; Masatoshi Kizaki, Osaka, both of Japan

[73] Assignee: Fuji Oil Company, Limited, Izumisano, Japan

[21] Appl. No.: 95,321

[22] Filed: Sep. 10, 1987

[30] Foreign Application Priority Data

Sep. 13, 1986 [JP] Japan ................................. 61-216205

[51] Int. Cl.$^4$ ............................................. A23D 5/00
[52] U.S. Cl. .................................. 426/602; 426/582; 426/656; 426/657
[58] Field of Search ................. 426/582, 602, 656, 657

[56] References Cited

U.S. PATENT DOCUMENTS

| | | | |
|---|---|---|---|
| 4,194,018 | 3/1980 | Hodel et al. | 426/582 X |
| 4,309,691 | 12/1981 | Sand et al. | 426/582 X |
| 4,397,878 | 8/1983 | Koide et al. | 426/582 X |

*Primary Examiner*—Donald E. Czaja
*Assistant Examiner*—Celine T. Callahan
*Attorney, Agent, or Firm*—Michael, Best & Friedrich

[57] ABSTRACT

Solid foodstuffs, such as cheese-like foodstuffs, are prepared from soybean protein, casein, oils and/or fats and water by first intimately mixing the soybean protein with water to entirely wet or hydrate the soybean protein prior to or separately from melting the casein by heating the system to an elevated temperature with agitation. In spite of the agitation with heating, the solid foodstuffs produced by the method have a smooth body which is free from a sandy feeling, dryness and crumbling and also has an excellent melting feeling to the tongue and mouth.

6 Claims, No Drawings

METHOD FOR PREPARING SOLID FOODSTUFFS

FIELD OF THE INVENTION

The present invention relates to methods for preparing solid foodstuffs, such as cheese-like foodstuffs from mixtures containing soybean protein, casein, oils and/or fats and water as essential ingredients.

BACKGROUND OF THE INVENTION

Heating at different points in processes for preparing solid foodstuffs, such as cheese-like products and the like, using soybean protein is known to cause certain problems. For example, Japanese Patent Application No. 6107/1974 describes a method for producing processed, cheese-like foodstuffs by kneading a mixture mainly composed of soybean protein isolate having a low gelation ability, casein(preferably a water-soluble casein) and oils and/or fats while adding water to the mixture, sealing the kneaded mixture in a casing, and then heating to cause gelation. In this method, it is important that the kneading is performed without heating. The gel of soybean protein formed by heating is destroyed by the mechanical agitation required for kneading and makes it impossible to form a continuous phase of tight protein. Consequently, the tissue of the resulting product becomes sandy and is not suitable for a cheese-like foodstuff.

Japanese Patent Application No. 146237/1983 describes a method for producing cheese-like foodstuffs by kneading protein mainly composed of vegetable protein (preferably soy protein isolate) with oils and fats and water and allowing the mixture to stand at a temperature of 0° to 60° C. for twenty minutes or longer to cause gelation. This application discloses that heating the kneaded mixture causes the resulting product to exhibit poor melting feeling to the tongue and to have a texture which is dry and crumbling and lacks smoothness.

Japanese Patent Application No. 108333/1986 discloses that good solid foodstuffs can be obtained only by mixing the raw materials in a specific order, namely, adding phosphates and/or citrates (and table salt if necessary) to water, dissolving the mixture, heating the resulting solution, adding protein, edible oils and fats and organic acids in that order and then agitating the mixture.

The methods described in Japanese Patent Application Nos. 6107/1974 and 146327/1983 do not employ mixing while the casein is melting from being heated like in conventional methods for producing processed cheese and, therefore, do not best utilize advantageous physical properties of casein. Also, these methods seriously restrict the use of rennet-casein which has the most excellent flavor among the caseins. Furthermore, the method disclosed in Japanese Patent Application No. 146237/1983 does not include heating the kneaded mixture to a temperature of 60° C. or higher after kneading which results in the product having poor storage characteristics.

The method disclosed in Japanese Patent Application No. 108333/1986 is complicated because the raw materials are added and mixed in multiple stages. This method also requires relatively high shearing forces (high speed agitation) at the stage where the protein is added. If such agitation is performed over a short time period with a low shearing force, there is a tendency to form undissolved lumps which adversely affect the texture of the product.

SUMMARY OF THE INVENTION

In the method provided by the invention, a solid foodstuff made from soybean protein, oils and/or fats, casein and water is prepared by intimately mixing soybean protein with water so that the soybean protein is entirely wetted or hydrated prior to or separately from melting the casein.

In one embodiment, powdery soybean protein, powdery casein and oils and/or fats are pre-mixed, water is added and intimately mixed therewith to entirely wet or hydrate the soybean protein and the resulting mixture is heated to a temperature of at least 80° C. in the presence of a melting salt.

In another embodiment, water is added to the pre-mixed ingredients and steam is blown into the mixture with increasing agitation until the temperature reaches at least 80° C.

DESCRIPTION OF THE PREFERRED EMBODIMENTS

The soybean protein used can be soy protein extract, soy protein concentrate, or soy protein isolate, preferably soybean protein having a crude protein content of at least 60% and a low gelation ability. When the crude protein content in the soybean protein is low, the product has a poor texture. Also, the gelation ability of the soybean protein affects the ratio of soybean protein to casein which can be used and still obtain a satisfactory emulsion. A satisfactory emulsion can be obtained with soybean protein to casein weight ratios (calculated as solids weight) of 2:1 or higher with soybean proteins which do not gel when subjected to the following gel measurement test: 12 g of powdered soybean protein is homogenized with 88 ml of a 2.5% table salt solution for three minutes in a whirling blender operated at 10,000 rpm and the resulting mixture is centrifuged, defoamed and finally quenched with water. On the other hand, with soybean proteins having a high gelation ability, i.e. ones that gel when subjected to the above gel measurement test, the weight ratio of soybean protein to casein must be about 1:1 or less. Generally, the weight ratio of soybean protein to casein is within the range of about 1:5 to about 3:1. This ratio can increase with a decrease in the gelation ability of the soybean protein.

The casein used can be rennet-casein, acid casein, caseinates and the like. It can also be in the form of a natural or imitation type cheese. Rennet-casein is particularly advantageous because of its excellent flavor characteristics and, therefore, is preferred. When caseinates are used with rennet-casein, the product has a body which is more resistant to breaking down upon being sliced than when only rennet-casein is used.

Rennet-casein or cheese melts upon being heated to a temperature of 80° C. or higher while being stirred together with melting salts and acid casein melts at a temperature of 74° C. or higher when being stirred together with an alkali.

The melting salts used can be any of the so-called cheese emulsifying agents used in preparing processed dairy cheese and the amount used is generally the same used in processing in dairy cheese. Orthophosphates, pyrophosphates, polyphosphates, metaphosphates, citrates and citric acid can be used in amounts ranging from about 0.1 to about 3.5, preferably about 0.5 to about 3 weight %, based on a total weight of the emulsion. Caseinates can be readily dissolved in water without melting salts.

Representatives suitable oils and fats include milk fat, grape seed oil, soybean oil, sunflower seed oil, cottonseed oil, peanut oil, rice bran oil, corn oil, safflower oil, olive oil, kapok oil, palm oil, coconut oil, palm nucleus oil, fish oil, beef tallow, lard, and mixtures thereof, including hardened oils, fractionated oils, and ester exchange oils. The amount of oils and/or fats used generally is about 0.6 to about 1.7 parts per 1 part of the total protein (soybean protein and casein). Lower amounts tend to result in a poor flavor and/or makes dispersion of the protein in the oils and fats difficult. On the other hand, larger amounts tend to make the system difficult to emulsify.

The amount of water used in the emulsion is within the range of about 30 to about 60, preferably about 30 to about 55 weight %, based on the total weight of the emulsion. Smaller amounts of water make it difficult to obtain an emulsion and larger amounts make it difficult to produce a solid foodstuff having a suitable hardness. If the emulsion is heated by contacting with steam, the amount of steam which condenses is included as part of the water in the formulation.

In order to obtain a homogeneous emulsion containing soybean protein, casein, oil and/or fats, it is important that the soybean protein is entirely wetted or hydrated prior to or separately from melting the casein. This permits the soybean protein, casein, oils and/or fats, and melting salt (if used) to be mixed and emulsified in a shorter period of time. While the reason for this is not fully understood, it appears that, with respect to water, the casein upon melting is in a dominant competitive relation to the soybean protein not yet entirely wetted or hydrated because the system has a high ionic strength. This prevents and retards wetting or hydration of the soybean protein and, thus, emulsification of the system.

Various approaches can be used for entirely wetting or hydrating the soybean protein prior to or separately from melting the casein. In one embodiment, a powdery soybean protein, oils and/or fats and powdery casein are pre-mixed, water is added and intimately mixed with this pre-mix to entirely wet or hydrate the soybean protein and the resulting mixture is heated to an elevated temperature with agitation to melt the casein. In another embodiment, water is added to the above mixture and steam is blown into the mixture with an increasing rate of agitation until the temperature reaches a predetermined level. In another embodiment, powdery soybean protein, oils and/or fats and powdery casein are mixed together with water to entirely wet or hydrate the soybean protein before melting the casein in the presence of a melting salt. In yet another embodiment, soybean protein and oils and/or fats are mixed with water to wet or hydrate the soybean protein; casein, oils and/or fats, and a melting salt(s) are separately mixed with water and the mixtures is heated with agitation to melt the casein; and the separately prepared soybean protein emulsion is added to and mixed with the casein melt to form a homogeneous emulsion. If desired and available, an undried soybean protein can be used in place of powdery soybean protein. However, undried soybean protein is generally not available unless one is a manufacturer of soybean protein.

Such approaches obviate the necessity of multi-stage mixing steps for adding water, melting salts, protein, oils and fats, acids, etc., in a specific order as required in prior processes. Also, the tendency for undissolved lumps of powders to be formed is minimized and a homogeneous mixture can be readily obtained without the use of high shearing forces.

After the soybean protein has been entirely wetted or hydrated, a homogeneous, stable emulsion can be obtained in a short period of time by heating the system to a temperature of about 80° C. or higher, preferably in the presence of a melting salt when rennet-casein is used. Obtaining such an emulsion is an important preliminary step in the production of foodstuff products having a smooth body free from separated oils and fats, dryness and crumbling.

As the weight ratio of soybean protein to casein increases, there is a tendency for the product to have a texture which is dissimilar to cheese and twines around teeth and which has a body with a plasticity like clay. These undesirable characteristics can be minimized by employing the technique disclosed by Japanese Patent Application No. 163206/1986, namely, using an alkaline earth metal type solidifying agent such as calcium chloride, calcium lactate and magnesium chloride in an amount within the range of about 0.05 to about 5 weight %, based on the weight of the soybean protein.

As in conventional processes for preparing dairy cheeses, suitable amounts of table salt, flavoring agents, sweeteners, colorants, agents for adjusting the pH of the product to 5 to 7, pastes such as carragheenan, guajak gum, and gum arabic, skim milk, emulsifying agents such as propylene glycol, fatty acid esters, polyglycerol esters, sorbitan fatty acid esters, glycerine fatty acid esters, and lecithin and fruit juices can be added at any step in the process prior to the final agitation step. When soybean protein is added in relatively large amounts and an alkaline earth metal type solidifying agent is used, additives such as table salt and acids which present dissolution or emulsification of soybean protein preferably are added after emulsification in order to maintain a good emulsion.

Suitable agitation means for the melting and/or mixture steps include vacuum cutters, silent cutters, cheese melting vessels and the like. The preferred temperature with agitation during the melting step is about 80° C. or higher. At lower temperatures, the casein melts insufficiently to take advantage of its desirable physical properties.

The solid foodstuffs prepared by the process of the invention have a solid body resembling cheese. However, cheese-like foodstuffs having a cheese-like solid body and a flavor which differs from cheese can be produced, for example, a fruit-like flavor.

Without further elaboration, it is believed that one skilled in the art can, using the preceding description, utilize the present invention to its fullest extent. The following examples are presented to exemplify the invention and should not be construed as limitations thereof.

EXAMPLE 1

A series of tests was run to determine the effect of intimately mixing soybean protein with water to entirely wet or hydrate the soybean protein prior to emulsification and melting casein. In each test, 14 parts of commercially available soy protein isolate ("FUJIPRO C L, manufactured by Fuji Oil Co., Ltd. Osaka, Japan,") having a low gel forming ability (i e., did not gel when subjected to the above gel measurement test), 13 parts of powdery rennet-casein and 29 parts of vegetable oils and fats having a melting point of 36° C. were pre-mixed in a cheese melt vessel having a treatment capacity of 5 kg. A solution made up of 2.4 parts of melting salts (sodium secondary phosphate and sodium citrate) and 32 parts of water was introduced into the vessel. While the resulting mixture was being agitated in the vessel, steam (approximately 8 parts as condensed water) was blown into the mixture until the temperature of the system reached 92° C. and agitation was continued at the same rate while maintaining the temperature at 92° C. The agitation rates for different tests were 60, 80 and 100 r.p.m. After an emulsified state was observed, a solution made up of 0.57 parts of citric acid, 1.4 parts of table salt and 4 parts of water was added to the emulsion. The agitation was continued for an additional minute and the system defoamed and allowed to stand to cool.

The casein alone was incapable of emulsifying all the oils and fats. Accordingly, the presence or absence of an oil layer was an indication as to whether the soy protein had been sufficiently melted with water or hydrate to achieve emulsification. For each test, the presence or absence of oils floating on the surface was noted when the temperature reached 92° C. and the time required for emulsification (the time period after the temperature reached 92° C. before stable emulsification was observed) was recorded. The results of these tests were as follows:

| Agitation Rate, r.p.m. | Mixture Condition When Temperature Reached 92° C. | Time Period For Emulsification, min. |
| --- | --- | --- |
| 60 | Oil floating on surface | 25 |
| 80 | Some oil floating on surface | 13 |
| 100 | No oil floating on surface | 3 |

All products had a smooth body which did not include isolated oils and fats and exhibited a good melting feel to the tongue. No undissolved lumps were formed even though agitation and heating were employed.

These results demonstrate that intimate mixing of soybean protein with water prior to the mixture being heated to an elevated temperature effects a wetting or hydration of the soybean protein which reduces the emulsifying time.

EXAMPLE 2

A cheese-like foodstuff was prepared in a manner similar to Example 1 except that the agitation was 60 r.p.m. and the mixture was agitated at that rate for 2 minutes prior to the initiation of blowing steam. No oil was floating during the time the temperature was being elevated to 92° C. and the time required thereafter for emulsification was only 2 minutes.

EXAMPLE 3

The procedure described in Example 2 was carried out except that soy protein isolate, rennet-casein, oils and fats and an aqueous solution of melting salts were charged simultaneously to a cheese melt vessel without pre-mixing and the mixture was agitated for a time sufficient to obtain wetting or hydration of the soybean protein (i.e., approximately 10 minutes) prior to initiation of blowing steam into the system. The time required for emulsification after the temperature reached 92° C. was only 2 minutes.

From a comparison of the results in Examples 2 and 3, it can be seen that pre-mixing soybean protein with oils and fats prior to mixing with water reduces the time required to entirely wet or hydrate the soybean protein.

EXAMPLE 4

A cheese-like foodstuff was prepared in a manner similar to Example 2 except that 0.5 parts of anhydrous calcium chloride and 0.6 parts of citric acid were used in place of 0.75 parts of citric acid in the solution added after emulsification. The texture and body of the product were superior to that of the product produced in Example 2.

EXAMPLE 5

The soy protein isolate and the oils and fats used in Example 1 were formulated in water at a ratio of 11 parts:10 parts:28 parts and the mixture was kneaded and emulsified in a silent cutter. The resulting emulsion was agitated in a cheese melt vessel together with an aqueous solution made up of 2.4 parts of melting salts, 11 parts of rennet-casein, 16 parts of oils and fats, and 16 parts of water. While being agitated at 60 r.p.m., steam was blown into the mixture and the temperature was elevated to 87° C. Thereafter, agitation of only 2 minutes was required to produce a satisfactory emulsion.

In another test a mixture of the soy protein isolate, oils and fats and water at a ratio of 11 parts:10 parts:28 parts was kneaded and emulsified in a silent cutter. A separate aqueous solution made up of 2.5 parts of melting salts, 11 parts of rennet-casein, 16 parts of oils and fats and 16 parts of water was introduced into a cheese melt vessel. While being stirred at 60 r.p.m., steam was blown into this solution to elevate the temperature to 87° C. The separately-prepared soy protein emulsion was added to the resulting casein melt and the mixture was further mixed to give a homogenous emulsion.

These examples demonstrate that, by intimately mixing soybean protein with water to entirely wet or hydrate the soybean protein prior or separately from melting the casein in accordance with the invention, mixing and emulsification of the raw materials can be performed in a shortened period of time. Also, even though agitation is performed with heating, the products are free from a sandy feeling, dryness or crumbling and have a excellent melting feeling to the tongue.

From the foregoing description, one skilled in the art can easily ascertain the essential characteristics of the invention and, without departing from the spirit and scope thereof, make various changes and modifications to adapt it to various usages.

We claim:

1. A method for preparing solid cheese-like foodstuffs consisting essentially of the steps of forming a homogeneous emulsion containing about 30 to about 60 weight % water, soybean protein having a crude protein content of at least 60%, a protein-containing casein selected from the group consisting of rennet-casein, acid casein, a caseinate and mixtures thereof, and oils or fats, the weight ratio of said soybean protein to said casein being within the range of about 1:5 to about 3:1 and the amount of said oils for fats being about 0.6 to about 1.7 parts per part of total protein (soybean protein and casein protein), by intimately mixing said soybean protein with water to entirely wet the soybean protein (a) in the presence of said casein or (b) prior to the addition of said casein; and when said mixing has been performed in the presence of said casein, heating the emulsion to an elevated temperature of at least 80° C. by blowing steam thereinto while agitating in the presence of a melting salt to melt said casein or, when said mixing has been performed before addition of said casein, separately melting said casein by heating to an elevated temperature of at least 80° C. by blowing steam thereinto while agitating in the presence of a melting salt and combining the melted casein with the remaining constituents of the emulsion.

2. A method according to claim 1 wherein the said soybean protein and casein are in powdery form and are mixed with said oils or fats prior to mixing with water.

3. A method according to claim 2 wherein said soybean protein is soy protein extract, soy protein concentrate or soy protein isolate.

4. A method according to claim 3 wherein said soybean protein has low ability of gelation.

5. A method according to claim 1 wherein said melting salt is mixed with said soybean protein along with water.

6. A method according to claim 1 wherein said soybean protein and said casein are in powdery form and the emulsion is heated to predetermined temperature of at least 80° C.

* * * * *

UNITED STATES PATENT AND TRADEMARK OFFICE
CERTIFICATE OF CORRECTION

PATENT NO. : 4,865,865
DATED : September 12, 1989
INVENTOR(S) : Hiroyuki Sano, et al.

It is certified that error appears in the above-identified patent and that said Letters Patent is hereby corrected as shown below:

Column 7, line 8, the words "case in" should read ---casein---.

Signed and Sealed this

Fourth Day of September, 1990

Attest:

HARRY F. MANBECK, JR.

*Attesting Officer*    *Commissioner of Patents and Trademarks*